(12) United States Patent
Sato et al.

(10) Patent No.: US 6,371,530 B1
(45) Date of Patent: Apr. 16, 2002

(54) TUBE JOINT

(75) Inventors: Taichi Sato, Nagaokakyo; Koichi Shirakawa; Kosuke Sakai, both of Kobe, all of (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 0 days.

(21) Appl. No.: 09/692,793

(22) Filed: Oct. 20, 2000

Related U.S. Application Data

(62) Division of application No. 09/392,927, filed on Sep. 9, 1999.

(51) Int. Cl.[7] .................................................. F16L 17/00
(52) U.S. Cl. ...................... 285/337; 285/379; 285/374; 285/348; 277/604; 277/609; 277/626
(58) Field of Search ................................. 285/337, 374, 285/379, 380; 277/604, 609, 626, 616, 630, 637, 644

(56) References Cited

U.S. PATENT DOCUMENTS

| | | | |
|---|---|---|---|
| 1,518,368 A | * | 12/1924 | Steed |
| 1,979,255 A | * | 11/1934 | Engel et al. |
| 2,037,084 A | * | 4/1936 | Moore |
| 3,015,510 A | * | 1/1962 | Bates |
| 3,510,140 A | * | 5/1970 | Hermann |
| 4,116,478 A | | 9/1978 | Yamaji et al. |
| 4,602,810 A | | 7/1986 | Babb, Jr. et al. |
| 4,867,488 A | * | 9/1989 | Jones |
| 5,297,826 A | * | 3/1994 | Percebois |
| 5,803,513 A | * | 9/1998 | Richardson |

FOREIGN PATENT DOCUMENTS

| | | | |
|---|---|---|---|
| DE | 2738453 | * | 3/1978 |
| EP | 0 899 495 A2 | | 3/1999 |
| FR | 2 694 063 A1 | | 1/1994 |
| GB | EPO 439313 | | 7/1991 |
| JP | 52-29624 | * | 3/1977 |
| JP | JA 0108922 | | 8/1979 |
| JP | EP-0899495 A2 | * | 3/1999 |

* cited by examiner

Primary Examiner—Lynne H. Browne
Assistant Examiner—Tomlyne A Malcolm
(74) Attorney, Agent, or Firm—Knobbe, Martens, Olson & Bear LLP

(57) ABSTRACT

A tube joint comprises: a pushing ring provided at its outer periphery with a projection and fitted to an outer periphery of one end of a joint tube; a tube or a joint body provided at is side opposed to the pushing ring with a projection opposed to the projection of the pushing ring, the tube or the joint body having a receiving portion which is widened toward the pushing ring and the tube or the joint body being fitted to an outer periphery of the joint tube with a peripheral gap left therebetween; a fastening tool capable of moving the pushing ring in a direction of the tube or the joint body; a packing provided between inner and outer side of the tube or the joint body and the joint tube, and fitted through the receiving portion by its own resilient deformation by operation of the fastening tool; and a spacer inserted between the pushing ring and the tube or the joint body to limit a distance between the pushing ring and the tube or the joint body to a constant value.

6 Claims, 4 Drawing Sheets

TUBE JOINT

This is a divisional application of U.S. patent application Ser. No. 09/392,927 filed Sep. 9, 1999, which claims priority based on Japanese patent application No. 11-219410 filed August 3.

BACKGROUND OF THE INVENTION

1. Field of the Invention

The present invention relates to a metal or resin tube joint used for water pipes and the like.

2. Description of the Related Art

FIG. 5 shows one example of a tube joint for jointing ends of axially opposed metal or resin tubes 1, 1 such that extending and contracting function and flexible function are provided. The tube joint includes a joint body 2 and a pair of push rings 3 and 3, and they are fastened by fastening means 4 which are T-shaped bolts and nuts. The joint body 2 includes opposed flange-like projections 2a and 2a, and a cylindrical barrel portion 2b which is integrally formed such as to swell between the projections 2a ,2a. Each of the projections 2a is provided at its inner periphery with a receiving port 2c whose diameter becomes wider toward its end. The push ring 3 also includes a projection 3a, the joint body 2 is located at the outer periphery between the joint tubes 1 and 1 while leaving a circumferential gap, and the push rings 3, 3 are disposed at the opposite ends, and the ends are fastened by the fastening tools 4. By fastening using the fastening tools 4, a rubber packing 5 set between the joint body 2 and each of the push rings 3 is pushed by surfaces of the push rings 3 and connected to the receiving port 2c in wedge form, and is also contacted to an outer peripheral surface of the joint tube 1 under pressure. With this, watertightness is established so that liquid flowing through the joint tubes 1, 1 should not leak outside.

As shown in FIG. 5 also, the conventional tube joint has a structure that if the fastening tools 4 are fastening, the rubber packing 5 can freely be fastened. Therefore, even if a tolerance fastening torque is indicated, the fastening state varies depending upon operators, and torque can not be controlled.

The cross section of the rubber packing 5 (JIS K6353; A type) shown in FIG. 5 is tapered, and any portions thereof are relatively hard, and homogeneous having the same resilience. Therefore, strong pressing force can not be obtained, and the sealing ability is not sufficient. As a rubber packing which can be used in the tube joint shown in FIG. 5, there exists one having soft portion (JIS K6353; K type), but a volume of the rubber packing occupied by the soft portion is smaller than that occupied by the hard portion, and there is a room for improvement of the resiliently deforming and sealing abilities.

SUMMARY OF THE INVENTION

The present invention has been accomplished to overcome the above-described conventional problems, and it is the first object of the invention to provide a tube joint in which the operation can easily be controlled by always obtaining a constant fastening force irrespective of magnitude of the fastening force, and the sealing ability is always reliably obtained constantly. It is another object to provide a tube joint in which the sealing ability is stronger than that of the prior art so that a constant sealing ability or greater can be reliably obtained.

To solve the above problems, a tube joint of the present invention comprises: a pushing ring provided at its outer periphery with a projection and fitted to an outer periphery of one end of a joint tube; a tube or a joint body provided at is side opposed to the pushing ring with a projection opposed to the projection of the pushing ring, the tube or the joint body having a receiving portion which is widened toward the pushing ring and the tube or the joint body being fitted to an outer periphery of the joint tube with a peripheral gap left therebetween; a fastening tool capable of moving the pushing ring in a direction of the tube or the joint body; a packing provided between inner and outer side of the tube or the joint body and the joint tube, and fitted through the receiving portion by its own resilient deformation by operation of the fastening tool; and a spacer inserted between the pushing ring and the tube or the joint body to limit a distance between the pushing ring and the tube or the joint body to a constant value.

With this structure, since the spacer for limiting the distance between the pushing ring and the tube or the joint body is inserted between the pushing ring and the tube or the joint body, the packing can always obtain a constant fastening force irrespective of the magnitude of the fastening force and therefore, the packing which is prone to be unstable due to the resilient deformation can always be fastened constantly, the operation is facilitated, the operation can easily be controlled, and since the packing may be fastened to the utmost, the sealing ability can always be obtained reliably and constantly.

It is preferable that the spacer is an independent ring provided between the pushing ring and the tube or the joint body.

With this structure, since the spacer is the independent ring, i.e., a spacer ring provided between the pushing ring and the tube or the joint body, the packing can be pushed by the entire ring uniformly as compared with a case in which the packing is pushed directly by the pushing ring whose portion in the circumferential direction can fasten using split mold, and the sealing ability is enhanced, which is convenient.

Further, a tube joint of the invention comprises: a pushing ring provided at its outer periphery with a projection and fitted to an outer periphery of one end of a joint tube; a tube or a joint body provided at is side opposed to the pushing ring with a projection opposed to the projection of the pushing ring, the tube or the joint body having a receiving port which is widened toward the pushing ring and the tube or the joint body being fitted to an outer periphery of the joint tube with a peripheral gap left therebetween; a fastening tool capable of moving the pushing ring in a direction of the tube or the joint body; a packing provided between inner and outer side of the tube or the joint body and the joint tube, and fitted through the receiving portion by its own resilient deformation by operation of the fastening tool; and a spacer inserted between the pushing ring and the tube or the joint body to limit a distance between the pushing ring and the tube or the joint body to a constant value, and the spacer being deformed by fastening operation of the fastening tool, thereby bringing the pushing ring and the tube or the joint body into abutment against each other.

With this structure also, the spacer is deformed by the fastening operation by the fastening tool, the pushing ring and the tube or the joint body abut against each other, the packing can always obtain a constant fastening force irrespective of the magnitude of the fastening force and therefore, the packing which is prone to be unstable due to the resilient deformation can always be fastened constantly, the operation is facilitated, the operation can easily be controlled, and since the packing may be fastened to the utmost, the sealing ability can always be obtained reliably and constantly.

It is preferable that the spacer is an independent resin ring provided between the pushing ring and the tube or the joint body, and is provided with an alignment projection.

With this structure, the packing can be pushed by the entire ring uniformly as compared with a case in which the packing is pushed directly by the pushing ring whose portion in the circumferential direction can fasten using split mold, and the sealing ability is enhanced. In addition to this, when the fastening tool is fastened, since it is made of resin, it is deformed easily, the spacer should not deviated laterally by the operation of the alignment projection and therefore, the packing should not be deformed, these can be disposed easily, and the operation is facilitated, which is convenient.

Further, a tube joint of the invention comprises: a pushing ring provided at its outer periphery with a projection and fitted to an outer periphery of one end of a joint tube; a tube or a joint body provided at is side opposed to the pushing ring with a projection opposed to the projection of the pushing ring, the tube or the joint body having a receiving portion which is widened toward the pushing ring and the tube or the joint body being fitted to an outer periphery of the joint tube with a peripheral gap left therebetween; a fastening tool capable of moving the pushing ring in a direction of the tube or the joint body; and a packing provided between inner and outer side of the tube or the joint body and the joint tube, and fitted through the receiving portion by its own resilient deformation by operation of the fastening tool, an inner periphery of the packing, in its natural state, being greater in diameter than an outer periphery of the joint tube.

With this structure, since the inner periphery of the packing, in its natural state, is greater in diameter than the outer periphery of the joint tube, the packing can be fitted to the joint tube easily, and can be pushed in without excessive resistance, a constant or greater sealing ability can reliably be obtained, which is convenient.

It is preferable that a deep portion of the receiving port at its constricted side is a cylindrical surface parallel to the joint tube, a soft portion of the packing is greater than a hard base of the packing in volume, a tip end of the soft portion is rounded in cross section so that the tip end is resiliently deformed in the parallel cylindrical surface and is fitted in under pressure.

With this structure, the deep portion of the receiving port at its constricted side is the cylindrical surface parallel to the joint tube, the tip end of the soft portion is rounded in cross section so that the tip end is resiliently deformed in the parallel cylindrical surface and is fitted in under pressure. Therefore, when the packing extends, contracts or bent, it is convenient because the seal holding function is stably exhibited. Further, since the soft portion of the packing is greater in volume than the hard base, the sealing ability is greater than that of the prior art, a strong self sealing ability is exhibited, and stronger sealing ability can be exhibited.

It is preferable that the base of the packing at the side of the pushing ring and a tip end of the packing at the side of the tube or the joint body are made of the same or different material, and if the base and the tip end are made of different material, the base is a hard portion and the tip end at the side of the tube or the joint body is a soft portion.

With this structure, if the base and the tip end are made of the same material, they can be formed integrally, the producing cost can be reduced, which are convenient, and if the base is a hard portion and the tip end at the side of the tube or the joint body is a soft portion, the pressure from the pushing ring is reliably transmitted to the hard portion, and the soft portion of the tip end is effectively pressed in, and this pressed in state is effectively held by the hard portion, the sealing ability is exhibited more effectively, which are convenient.

It is preferable that the tube joint further comprises a spacer inserted between the pushing ring and the tube or the joint body to limit a distance between the pushing ring and the tube or the joint body to a constant value. With this structure, the packing can always obtain a constant fastening force irrespective of the magnitude of the fastening force, which is convenient.

DETAILED DESCRIPTION OF THE PREFERRED EMBODIMENTS

Figure 1:
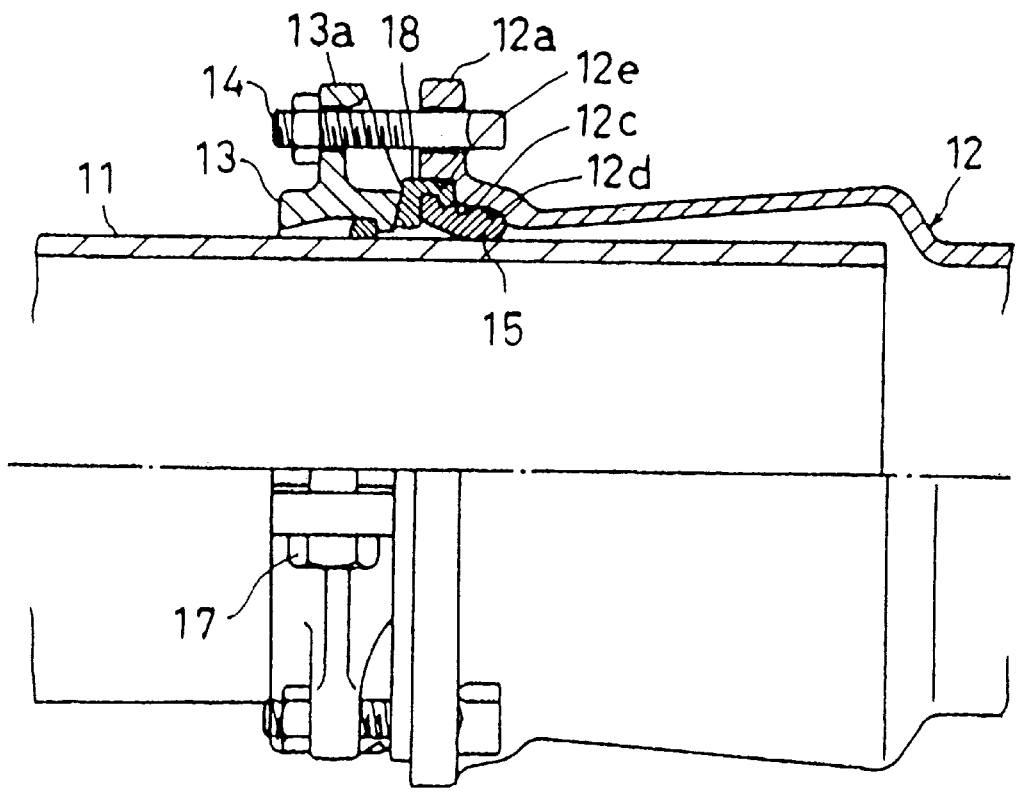
FIG. 1 is a half sectional view showing an embodiment.
Figure 2:
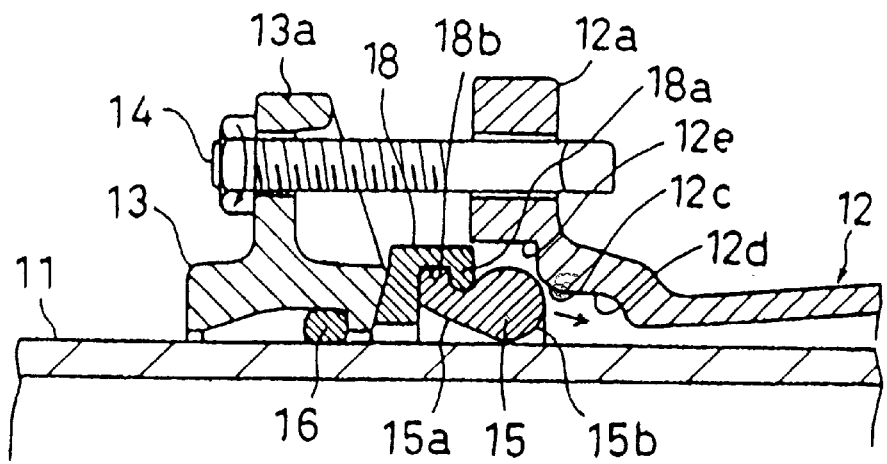
FIG. 2 is an enlarged sectional view showing the structure shown in FIG. 1 immediately before being fastened.

Embodiments of a tube joint of the present invention will be explained in detail with reference to the drawings. FIGS. 1 and 2 show one embodiment, wherein FIG. 1 is a half sectional view in a jointed state, and FIG. 2 is an enlarged sectional view showing the structure immediately before being fastened.

The tube joint of the present embodiment is for jointing a metal or resin joint tube 11 and a tube 12, but may joint a pair of joint tubes 11. With respect to the joint tube 11, the tube 12 is extended rightward in FIG. 1, and its left end is formed slightly thicker such that a peripheral gap is left in the joint tube 12, and a flange-like projection 12a is integrally formed on a left end of the tube 12. A plurality of, e.g., four bolt insertion holes are formed in the projection 12a in the peripheral direction. The projection 12a is formed at its base with a receiving port 12c which is widened toward a push ring 13. A pressing portion 12d which is a cylindrical surface parallel to the joint tube 11 is continuously formed on the receiving portion 12c at its constricting side. The widening side of the receiving port 12c is stepwisely widening, and this portion is a receiving hole 12e.

At the side of the pushing ring 13, a coming-out preventing ring 16 is provided at its inner periphery, and the pushing ring 13 is formed at its outer periphery with a projection 13a. The projection 13a and the projection 12a are opposed to each other in the axial direction. As shown in FIG. 1, the pushing ring 13 is separated at one location, so that the pushing ring 13 can be fastened by a fixing tool 17. The projection 13a is formed with a bolt insertion hole corresponding to the bolt insertion hole of the projection 12a. The fastening tool 14 comprising T-shaped bolt and nut can be inserted through both the bolt insertion holes and fastened.

A spacer ring 18 and a rubber packing 15 are combined and interposed between the tube 12 and the pushing ring 13. The spacer ring 18 is made of metal or resin, and has inner diameter greater than an outer diameter of the joint tube 11, and has a substantially L-shaped cross section. The spacer ring 18 is formed at its tip end inner periphery at the side of the tube 12 with an engaging lip 18a, and is formed at its inner periphery with a groove 18b. The rubber packing 15 is made of SBR (styrene-butadiene rubber) or the like.

On the other hand, the rubber packing 15 is integrally provided with a base 15a having a convex portion fitted in the groove 18b and a concave portion which is continuous with the convex portion, and a round tip end 15b. As shown in FIG. 2, the rubber packing 15 has an inner diameter slightly greater than an outer diameter of the joint tube 11 so that the rubber packing 15 can easily be fitted over the joint tube 11.

Especially, in this rubber packing 15, the base 15a is a hard portion (heel portion) and the tip end 15b is a soft portion (valve portion). Unlike the prior art, the soft portion has greater volume than that of the hard portion so that a strong self sealing ability can be exhibited. That is, if water pressure is applied to this portion, strong sealing ability proportional to the magnitude of the water pressure can be exhibited.

The pushing ring 13, the spacer ring 18 with the rubber packing 15 are set around the joint tube 11 in this order, and the end of the tube 12 is put on the outer periphery of the joint tube 11. Then, the fastening tools 14 are inserted through the bolt insertion holes to establish the state shown in FIG. 2. From this state, if the fastening tools 14 are fastened, the pushing ring 13 pushes the spacer ring 18 toward the tube 12, and pushes also the rubber packing 15, and the rubber packing 15 is resiliently deformed as shown with the arrow in FIG. 2, and a portion of its tip end 15b slides in the pressing portion 12d through the receiving portion 12c and tightly presses, and a remaining portion of the tip end 15b fitted in the receiving portion 12c. FIG. 1 shows such a state.

If the fastening tool 14 is further fastened, the tip end of the spacer ring 18 abuts against a wall surface in the receiving hole 12e. In this state, even if attempt is made to further fasten the fastening tool 14 with greater torque, the pushing ring 13 can not be moved, and the resilient deformation of the rubber packing 15 is completely stopped, and the fastening operation of the fastening tool 14 is stopped naturally. In this case, the tip end of the spacer ring 18 and the wall surface in the receiving hole 12e abut against each other at their surfaces and therefore, the fastening operation of the fastening tool 14 can be stopped reliably.

With this structure, it is possible to always provide the packing with constant fastening force irrespective of magnitude of the fastening force of the fastening tool and therefore, since it is possible to always fasten the packing which is prone to be unstable with the resilient deformation, the operation is facilitated, and the control of the operation is easy. Further, the packing may be fastened to the utmost, it is possible to always obtain the constant sealing ability reliably. According to the present embodiment, the sealing ability is stronger than that of the prior art so that a constant sealing ability or greater can be reliably obtained.

[Another Embodiments of the Invention]

(a) In the above embodiment, the spacer ring 18 can abut against the wall surface in the tube 12 at their surfaces by pushing the pushing ring 13 in the direction of the tube 12. Instead of this structure, as shown in FIG. 4, a resin spacer ring 28 which can be fitted to the packing 25 may be inserted between the pushing ring 13 and a tube 12', and the spacer ring 28 may deform and abut against the pushing ring 13 and the tube 12' by the fastening function by the fastening (not shown) of a type shown in FIG. 1. Even with this structure, it is possible to always provide the packing with constant fastening force irrespective of magnitude of the fastening force of the fastening tool and therefore, since it is possible to always fasten the packing which is prone to be unstable with the resilient deformation, the operation is facilitated, and the control of the operation is easy. Further, the packing may be fastened to the utmost, it is possible to always obtain the constant sealing ability reliably. The sealing ability is stronger than that of the prior art so that a constant sealing ability or greater can be reliably obtained. A receiving port of the tube 12' has a longer inclined portion as compared with that of the receiving portion 12c shown in FIG. 1, so that the spacer ring 28 can be inserted easily as will be explained next.

Figure 3:
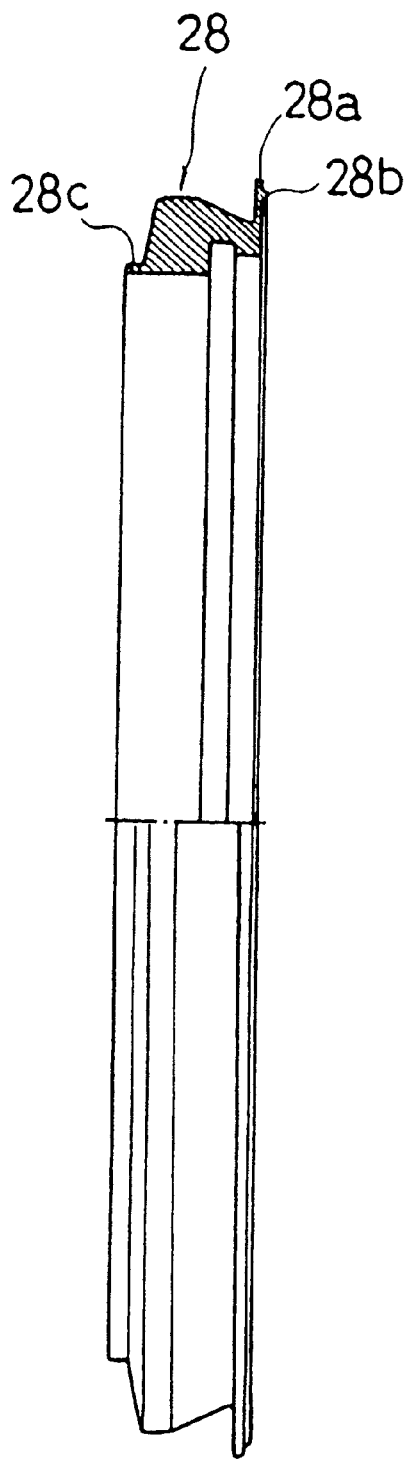
FIG. 3 is a half sectional view showing a spacer of another embodiment of the present invention.

Unlike the spacer 18 shown in FIG. 1, the spacer ring 28, as shown in FIG. 3, is provided with a flange 28a opposed to the tube 12', and at the side thereof opposed to the pushing ring 13, a fin 28c which is opposed to the pushing ring 13 for facilitating the alignment of the pushing ring 13 is formed. Further, a projection 28b capable of engaging a flange-like projection 12a' of the tube 12' is formed on the flange 28a, so that when the spacer ring 28 abuts against the tube 12', a inner corner of the flange-like projection 12a' of the tube 12' which forms an entrance of receiving hole 12e', the flange 28a and the projection 28b of the spacer ring 28 abut against each other at their surfaces, and the spacer ring 28 can be aligned easily.

If the tube joint is formed as described above, when it is transported from the factory to the working site, factory-adjusted positions of the pushing ring and the packing should not be deviated, and a troublesome operation that the joint is again disassembled in the working side for inspection and the joint is again assembled is not necessary at all, which is convenient. That is, in the case of the conventional tube joint, when if it is transported from the factory to the working side in a state where the pushing ring is directed downward, the pushing ring is moved in a direction biasing the packing in some cases. In that case, the diameter of the packing is reduced by the influence of the tapered receiving port, and there is a possibility that the packing can not be fitted to the joint tube substantially and therefore, it was necessary to again disassemble the tube joint for inspection in the working side and to assemble again. However, in the present embodiment, such an operation is unnecessary.

The packing 25 includes a base comprising the hard portion and a tip end comprising the soft portion similar to those shown in FIG. 1, but the soft portion has an outer diameter greater than the packing 15 so that greater self sealing ability can be exhibited. That is, in the case of the packing 15 shown in FIG. 1, the diameters of the base and the tip end are almost the same, but in the case of the packing 25 shown in FIG. 4, the outer diameter of the tip end is greater than that of the base and with this design, greater self sealing ability can be exhibited. The base and the tip end of the packing 25 may be made of the same material.

Similar to the spacer ring 18 in the previous embodiment, the groove which is similar to the spacer ring 18 shown in FIG. 1 is formed in the inner periphery of the spacer ring 28 so that the base of the packing 25 having the concave is fitted to the groove. As in FIG. 2, a coming-out-preventing ring 16 is provided along the inner periphery of the pushing ring 13.

Figure 4A:
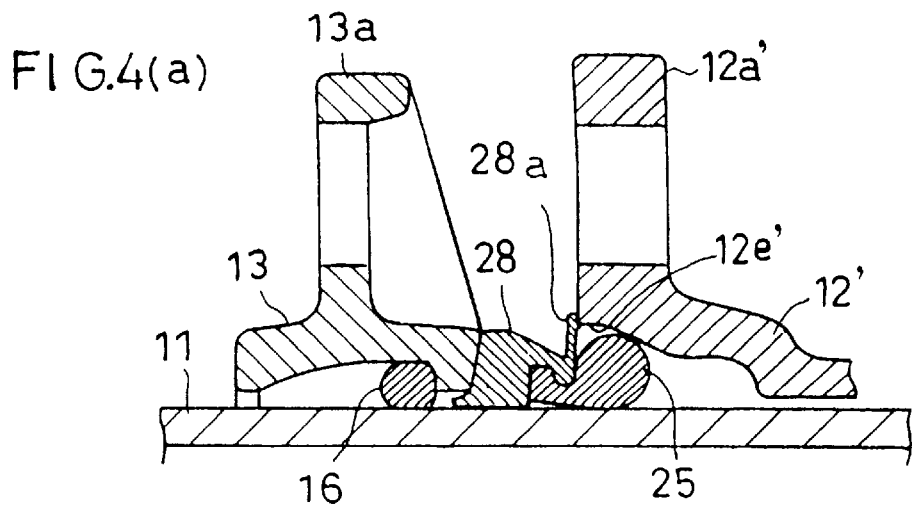
FIG. 4 is a partial sectional view for explaining the operation of the spacer shown in FIG. 3.
Figure 4B:
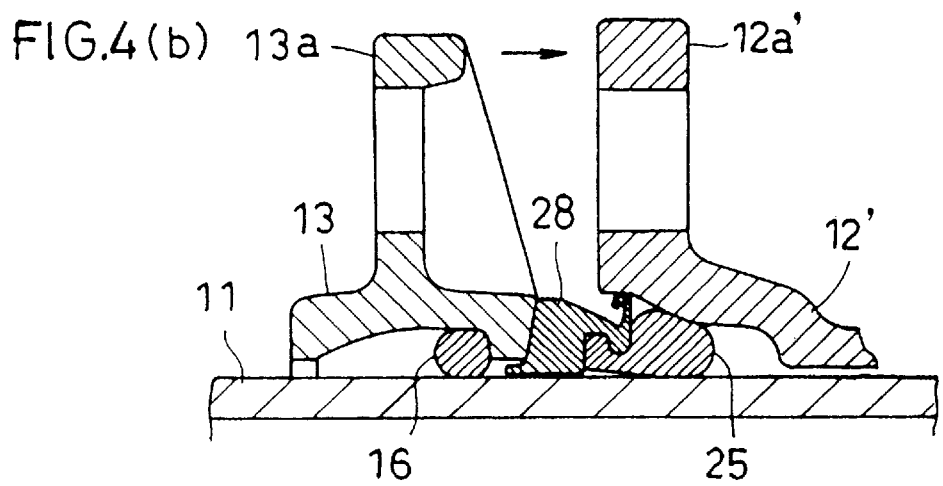
Figure 4C:
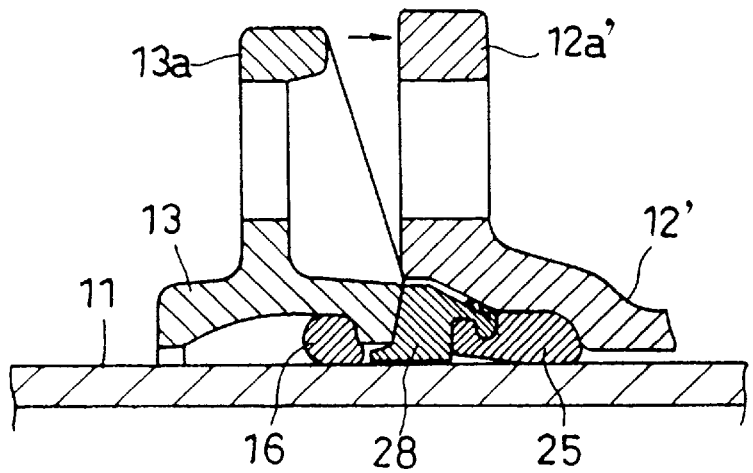
Figure 5:
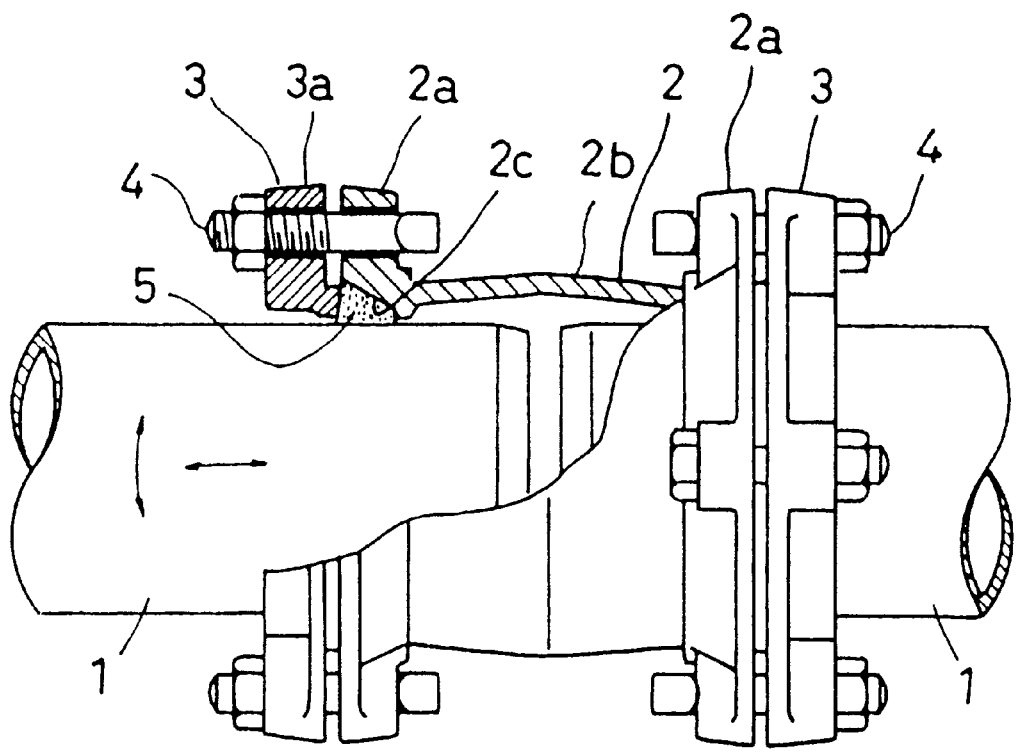
FIG. 5 is a partially cut-away front view showing a structure of a conventional tube joint.

Next, the operation of the spacer ring 28 will be explained with reference to FIG. 4. FIG. 4(a) shows a state where the pushing ring 13, the spacer ring 28 with the rubber packing 25 are set around the joint tube 11 in this order, and the end of the tube 12' is put on the outer periphery of the joint tube 11. This state is changed to a state shown in FIG. 4(b) by fastening the fastening tool which is not shown. In this case, the flange 28a of the spacer ring 28 is bent and deformed. If further deformed, as shown in FIG. 4(c), the packing 25 is pushed toward the pressing portion, and the tip end of the pushing ring 13 abuts against the inner corner of the flange-like projection 12a' so as to prevent further advance.

(b) As the spacer for limiting the distance between the pushing ring 13 and the tube 12, 12' or the joint body to a constant value, any member will suffice if it includes a ring which is integrally projected toward the push ring 13 or the tube 12, 12' and abuts against the mating to limit the movement constantly.

(c) Although the base of the packing comprises the hard portion and the tip end comprises the soft portion in the above embodiment, the base and the tip end may be made of the same material. With this structure, there are merits that it is possible to omit the steps of providing both the soft portion and the hard portion and jointing both the portions, and the producing cost can be reduced. In this case, the entire packing may be made of the same material as that of the hard heel portion or the soft valve portion, or may be made of material having the intermediate characters between the heel portion and the valve portion having both the functions.

What is claimed is:

1. A tube joint comprising:
   a pushing ring provided at its outer periphery with a projection and fitted to an outer periphery of one end of a joint tube;
   a tube or a joint body provided at its side opposed to said pushing ring with a projection opposed to said projection of said pushing ring, said tube or said joint body having a receiving portion which is widened toward said pushing ring and said tube or said joint body being fitted to an outer periphery of said joint tube with a peripheral gap left therebetween;
   a fastening tool capable of moving said pushing ring in a direction of said tube or said joint body; and
   a packing provided between an inner side of said tube or said joint body and an outer side of said joint tube, and fitted through said receiving portion by its own resilient deformation by operation of said fastening tool; and
   a spacer inserted between said pushing ring and said tube or said joint body to limit a distance between said pushing ring and said tube or said joint body to a constant value, said spacer being coupled with said packing and having a flange projecting outward beyond said receiving portion of said tube or said joint body, said flange being bent and deformed along said receiving portion when being pushed to push said spacer in said receiving portion by fastening operation of said fastening tool, thereby bringing said pushing ring and said tube or said joint body into abutment against each other.

2. The tube joint according to claim 1, wherein said flange has a projection configured to contact said receiving portion of said tube or said joint body when said flange touches said tube or said joint body.

3. The tube joint according to claim 1, wherein said spacer has a fin on a side in contact with said pushing ring, said fin being inserted between said pushing ring and an outer periphery of said joint tube.

4. A tube joint comprising:
   a pushing ring provided at its outer periphery with a projection and fitted to an outer periphery of one end of a joint tube;
   a tube or a joint body provided at its side opposed to said pushing ring with a projection opposed to said projection of said pushing ring, said tube or said joint body having a receiving portion which is widened toward said pushing ring and said tube or said joint body being fitted to an outer periphery of said joint tube with a peripheral gap left therebetween;
   a fastening tool capable of moving said pushing ring in a direction of said tube or said joint body;
   a packing provided between an inner side of said tube or said joint body and an outer side of said joint tube, and fitted through said receiving portion by its own resilient deformation by operation of said fastening tool, an inner periphery of said packing, in its natural state, being greater in diameter than an outer periphery of said joint tube, and
   a spacer capable of fitting to said packing and inserted between said pushing ring and said tube or said joint body, said spacer being coupled with said packing and having a flange projecting outward beyond said receiving portion of said tube or said joint body, said flange being bent and deformed along said receiving portion when being pushed to push said spacer in said receiving portion by fastening operation of said fastening tool, thereby bringing said pushing ring and said tube or said joint body into abutment against each other.

5. The tube joint according to claim 4, wherein said flange has a projection configured to contact said receiving portion of said tube or said joint body when said flange touches said tube or said joint body.

6. The tube joint according to claim 4, wherein said spacer has a fin on a side in contact with said pushing ring, said fin being inserted between said pushing ring and an outer periphery of said joint tube.

* * * * *